United States Patent [19]

Sangster

[11] 4,030,826

[45] June 21, 1977

[54] EXPOSURE STATION FOR A CONTACT PRINTING DEVICE

[76] Inventor: Arlon G. Sangster, P.O. Box 414, Sterling, Mass. 01564

[22] Filed: May 27, 1975

[21] Appl. No.: 580,580

[52] U.S. Cl. .............................. 355/104; 355/117
[51] Int. Cl.² ...................................... G03B 27/22
[58] Field of Search ................... 355/104, 117, 113

[56] References Cited

UNITED STATES PATENTS

| 2,024,678 | 12/1935 | Brunk | 355/104 X |
| 2,223,341 | 12/1940 | Ernst et al. | 355/117 |
| 2,585,519 | 2/1952 | Van Der Grinten | 355/104 |
| 2,653,529 | 9/1953 | Stover | 355/104 |
| 2,743,653 | 5/1956 | Kennedy et al. | 355/104 |

FOREIGN PATENTS OR APPLICATIONS

| 1,077,533 | 3/1960 | Germany | 355/104 |
| 926,029 | 5/1963 | United Kingdom | 355/104 |

*Primary Examiner*—Fred L. Braun
*Attorney, Agent, or Firm*—Charles R. Fay

[57] ABSTRACT

An apparatus for exposing flexible contact originals or negatives to flexible sensitized reproduction media consisting of a rotatable transparent or translucent cylinder, a fluorescent tube located axially therein, a flexible cover member attached thereto at one end with the other end being free and unsupported for manual pulling action, and spring biased return mechanism for drawing the cover member about the periphery of the cylinder. The apparatus has a manually controlled braking system which normally prevents rotation of the cylinder and is manually released by the operator of the apparatus to permit the spring biased return to draw the cover member about the cylinder.

3 Claims, 6 Drawing Figures

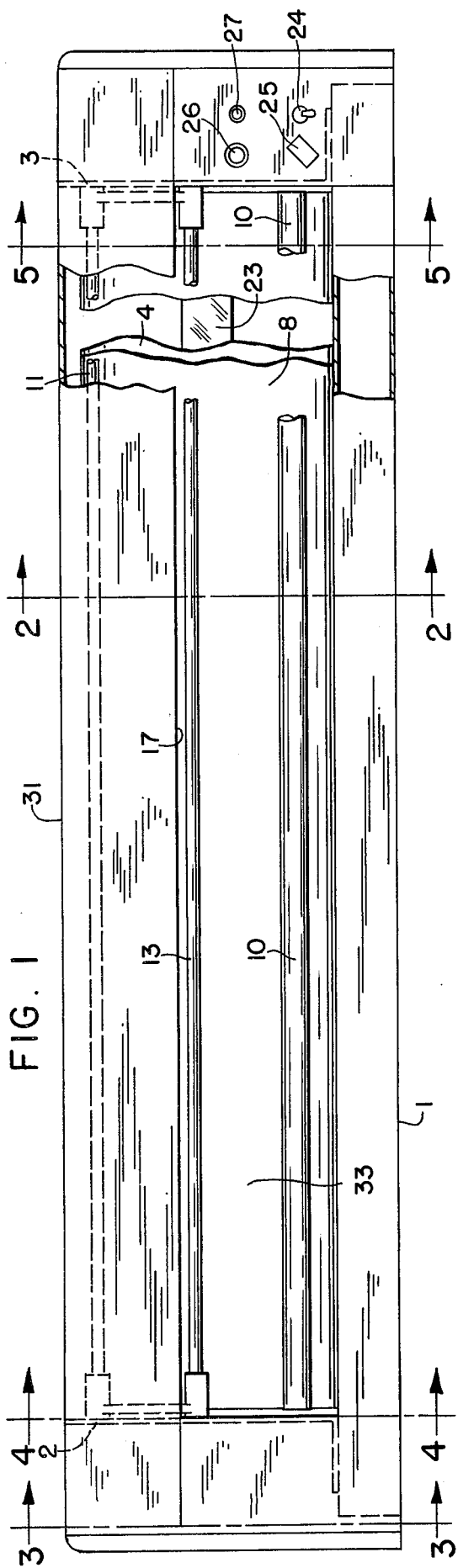
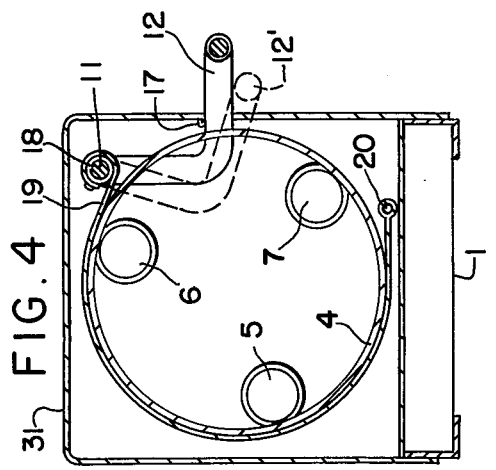
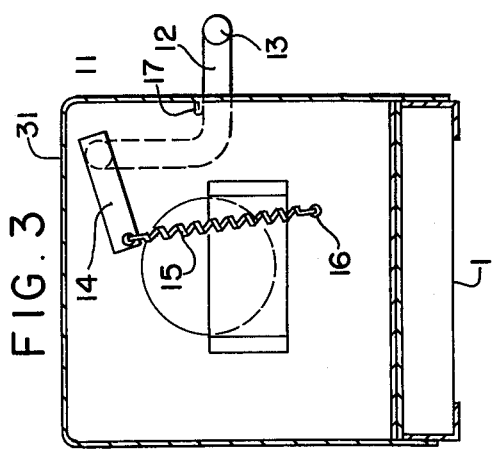
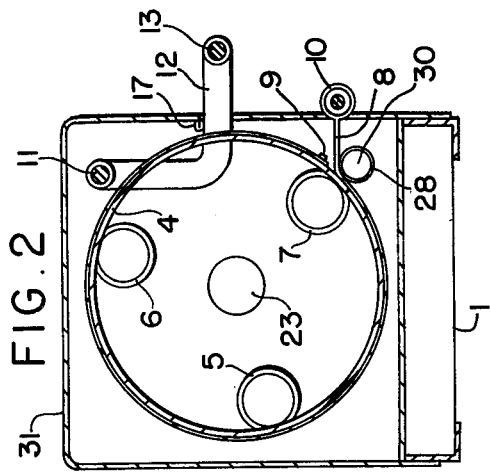

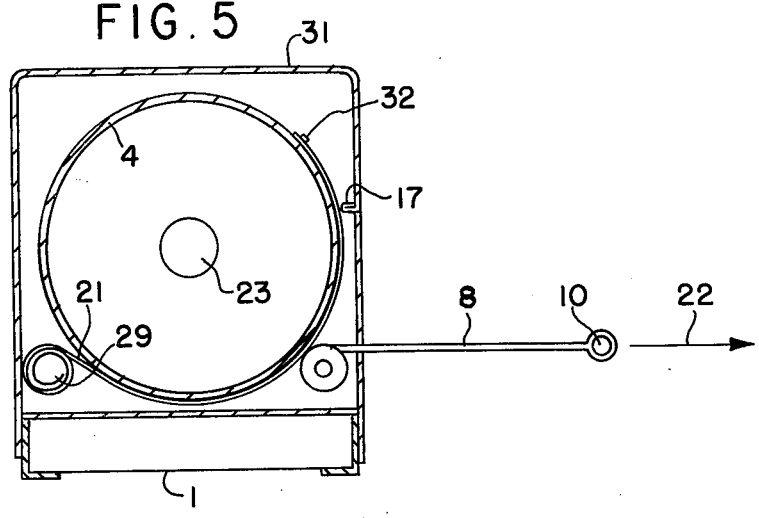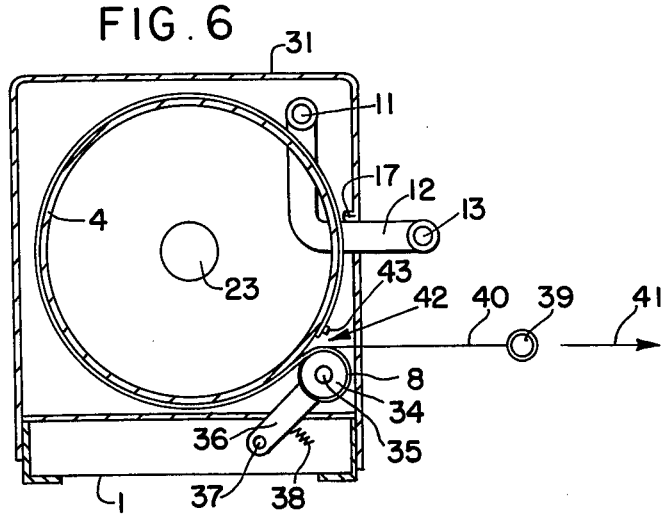

EXPOSURE STATION FOR A CONTACT PRINTING DEVICE

BACKGROUND OF THE INVENTION

Blueprint machines are designed to be motor driven and continuous running in order to make as many prints as possible within a given period of time and these machines are generally too expensive for small offices, individuals, and various individual departments in conventional businesses or manufacturing operations. It is an object of the present invention to provide a simple, low cost contact exposure apparatus which does not need a motor and has a minimum of moving parts subject to wear and over which the operator has complete control.

SUMMARY OF THE INVENTION

This invention relates to an apparatus arranged to provide a means for exposing sensitized paper or film in contact with a transparent or translucent original to a light source, the original being located between the light source and the sensitized paper or film, both being held in contact with a light-permeable cylinder by means of a conforming flexible cover member. An essentially linear light source, as for instance a fluorescent lamp, is located with its axis coincident with the axis of a transparent cylinder thereby assuring an even distribution of illumination to all points on the cylinder. The flexible member is arranged with one edge arranged to be grasped by hand, the opposite end being attached longitudinally to the transparent cylinder. When drawn away from the cylinder by hand, this causes rotation of the cylinder about its axis against the force of a spring. A friction brake holds the cylinder against rotation by the action of the spring. The brake release is actuated by a bar located immediately above the flexible member and adjacent the area where originals and sensitized paper are loaded into the machine. Originals and sensitized paper may be readily held in alignment with both hands and the brake released by the action of the pressure of the operator's hand, arm, or wrist. Release of this pressure allows the brake to be immediately reapplied thereby stopping cylinder rotation, the original and sensitized paper having been drawn into the machine by the rotation of the cylinder and retained between the flexible member and the cylinder.

BRIEF DESCRIPTION OF THE DRAWINGS

FIG. 1 is a view in elevation showing the machine substantially as viewed from the operator's position;

FIG. 2 is a transverse section through the machine on line 2—2 of FIG. 1;

FIG. 3 is a transverse section on line 3—3 of FIG. 1;
FIG. 4 is a transverse section on line 4—4 of FIG. 1;
FIG. 5 is a transverse section on line 5—5 of FIG. 1; and FIG. 6 is a section illustrating a modification.

PREFERRED EMBODIMENT OF THE INVENTION

A base 1 mounts end plates 2 and 3 arranged to support a transparent or translucent cylinder 4 by means of rollers 5, 6, and 7 at each end of cylinder 4 thereby allowing rotation of the cylinder 4 about its axis. The rollers are provided with flanges arranged to limit axial motion of the cylinder. A flexible cover member 8, conforming to the outside diameter of cylinder 4, is attached at one of its ends to cylinder 4 by e.g., a strip 9 and a series of attaching means, rivets, screws, or the like (not shown). The opposite end of flexible member 8 is provided with a longitudinal loop to accept a handle 10 which extends beyond both sides of flexible member 8.

Mounted on a shaft 11 there are two similar arms 12, each attached to an end of rod 13. An arm 14, also attached to shaft 11, is connected to a tension spring 15 which has at its opposite end a fixed support point 16. The action of spring 15 forces arms 12 against a stop 17 which is an integral part of a housing 31 about the cylinder. A roller 18, FIG. 4, is mounted on shaft 11, and is secured against rotation relative to shaft 11, and has attached to it a narrow strip of flexible friction material 19 which conforms to and contacts cylinder 4 longitudinally spaced beyond flexible member 8, completely avoiding it. The other end of strip 19 is secured at a fixed point 20.

Motion of arms 12 and rod 13 toward the cylinder 4 from the solid line position to the dotted line position, FIG. 4, causes rotation of shaft 18 and allows extension of the flexible brake material 19, releasing it from the surface of the cylinder 4.

A constant force spring 21, FIG. 5, one end of which is attached to cylinder 4 at point 32, is coiled at its other end about a support 29. The action of spring 21 serves to impart a clockwise motion to cylinder 4. Spring 21 is narrow and mounted to avoid flexible member 8 at end of cylinder 4 opposite to brake member 19. Fluorescent light source 23 is mounted with its axis coincident to axis of the cylinder 4 and ideally extends beyond cylinder 4 at each end. Housing 31 is attached to the base and substantially covers the mechanism except for an opening 33 which allows access to flexible member 8 and further allows viewing of the placement of the original and sensitized paper through transparent cylinder 4.

Operating controls, FIG. 1, are mounted on housing 31 and include: Off-on switch 24, time delay setting control adjust knob 25, indicator lamp 26, and momentary contact push button 27. Not shown is a time delay circuit the duration of which is determined by the setting of the control knob 25 and initiated by the momentary action of push button 27, turning on lamp 23 effecting exposure of the material in the machine. When lamp 23 turns on, indicator lamp 26 is turned off and remains off until the timer times out, turning off lamp 23 and turning on lamp 26. This serves to tell the operator that the timing cycle has been completed. The operation of the timer controls the winding of the fluorescent lamp ballast in a manner which leaves the heaters always on and turns on only the additional connections to operate the high voltage terminals causing the lamp to fluoresce. Allowing the heaters to remain on when the lamp is not fluoresing extends the life of the tube.

The operation of the apparatus is as follows:

Flexible member 8 is extended manually in the direction of arrow 22, FIG. 5. Maximum extension is limited by strip 9 being stopped by roller 28 mounted on shaft 30 whose axis is parallel to axis of cylinder 4. In this position the transparent or translucent original is placed over a sensitized reproduction media and the coinciding edges inserted between the cylinder 4 and the flexible member 8. While holding original and sensitized media in position, pressure on bar 13 by hand, wrist, or arm will release the brake and allow the spring to rotate cylinder 4 in a clockwise direction thereby forcing original and sensitized media against the transparent surface of cylinder 4. Release of pressure against bar 13 sets the brake and stops the rotation of cylinder 4. In like manner, additional originals and sensitized media may be inserted as the capacity of the cylinder surface area will allow. After the brake release has allowed the cylinder to rotate fully clockwise until handle 10 is stopped against housing 31, the momentary push button may be operated at any time to initiate the exposure cycle by turning lamp 23 on and, after an appropriate delay, off.

Since the operation of the equipment is not continuous in nature, the number of originals placed in the apparatus for exposure is limited only by the area available for exposure to the lamp, there being no constraint on the time allowed to place the originals and sensitized paper in the apparatus. In a similar manner, once placed in position, there is no limit to the time which may elapse before the timed exposure or removal from the apparatus, except that dictated by the effect of ambient light on the sensitized paper. The sensitized paper is normally developed by exposure to ammonia fumes or like material and is not a part of this invention.

It will be seen that the machine may be started, but the operator need not stay there, but may go on about other business and return to extract the print at any later convenient time.

FIG. 6 illustrates a variation of the basic apparatus wherein the flexible member 8 is rolled onto a roller 34 which is free to turn on shaft 35 under the influence of a spring, not shown, which rotates roller 34 in a clockwise direction as cylinder 4 turns in an anti-clockwise direction. The spring, not shown, which rotates roller 34 is considerably weaker than spring 21 which restores cylinder 4 in a clockwise direction when brake release arms 12 and rod 13 are operated. Arms 36 at each end of roller 34 are pivoted on a rod 37 which serves to keep roller 34 and flexible member 8 in contact with cylinder 4 at all times under the influence of compression springs 38 located at each end of roller 34 and which work against arms 36. Manual operation of a pull ring 39 and a cable 40, which is attached to cylinder 4 at point 43, in direction of the arrow 41, serves to turn cylinder 4 in an anti-clockwise direction and allows a spring, not shown, to cause roller 34 to accept flexible member 8. Originals and sensitized paper are fed into opening 42 between flexible member 8 and cylinder 4 where the operation of the brake release arms 12 and rod 13 will allow spring 21 to rotate cylinder 4 in a clockwise direction thereby capturing originals and sensitized paper between flexible member 8 and cylinder 4.

I claim:

1. Apparatus for making prints comprising a translucent cylinder, means supporting the same, a source of light located therein, means rotatably mounting said cylinder,
   a flexible cover member attached longitudinally to the cylinder at one end of the cover member, the other end of the cover member being free and the cover member passing about the cylinder,
   the free end of the cover member being adapted for manual pulling action, rotating the cylinder from an original position where the cover member is fully wound on said cylinder to a work loading station where said cover member is unwound and extended from said cylinder, spring biased return means to return the cover member and the cylinder to said original position upon release of said free end of said cover member,
   a brake for the cylinder, means for normally applying the brake to stop rotation of the cylinder at any position thereof, and manual means to release the brake and to allow rotation of said cylinder,
   said manual brake release means including a rod which is located above and adjacent the cover member in the work loading station of the cover member and which is operable by the operator as he loads the apparatus, said rod being substantially parallel to said cylinder and extending substantially across said cover member.

2. The apparatus of claim 1 including a roller parallel to said cylinder, said roller forming a limit stop for the rotation of the cylinder.

3. The apparatus recited in claim 1 including a spring loaded roller on which the flexible cover member is stored in the extended position thereof.

* * * * *